United States Patent [19]

Richardson

[11] Patent Number: 4,540,201
[45] Date of Patent: Sep. 10, 1985

[54] TUBE CONNECTOR

[75] Inventor: William D. Richardson, Palos Park, Ill.

[73] Assignee: Tuthill Corporation, Chicago, Ill.

[21] Appl. No.: 494,616

[22] Filed: May 16, 1983

[51] Int. Cl.³ .............................................. F16L 17/04
[52] U.S. Cl. .................................... 285/101; 285/104; 285/108; 285/306; 285/308; 285/322
[58] Field of Search ............... 285/101, 102, 104, 105, 285/108, 306, 309, 310, 314, 322, 323, 348, 359, 308

[56] References Cited

U.S. PATENT DOCUMENTS

| | | | |
|---|---|---|---|
| 1,031,637 | 7/1912 | Fischer | 285/315 X |
| 1,714,465 | 5/1929 | Murphy | 285/101 X |
| 1,827,257 | 10/1931 | Parker | 285/105 |
| 1,904,627 | 4/1933 | Olevin | 285/314 X |
| 1,973,809 | 9/1934 | Heggem | 285/309 X |
| 2,806,538 | 9/1957 | Conrad | 285/322 X |
| 2,819,733 | 1/1958 | Maisch | 285/308 X |
| 3,422,980 | 1/1969 | Richardson | 220/46 |
| 3,542,076 | 11/1970 | Richardson | 285/338 X |
| 3,727,952 | 4/1973 | Richardson | 285/322 X |
| 3,738,688 | 6/1973 | Racine | 285/312 |
| 3,779,587 | 12/1973 | Racine | 285/312 |
| 3,799,207 | 3/1974 | Richardson et al. | 138/89 |
| 3,825,223 | 7/1974 | Richardson | 251/149.6 |
| 3,857,414 | 12/1974 | Richardson et al. | 138/90 |
| 3,868,132 | 2/1975 | Racine | 285/312 |
| 4,059,295 | 11/1977 | Helm | 285/105 X |
| 4,326,407 | 4/1982 | Van Meter | 285/323 X |

Primary Examiner—Dave W. Arola
Attorney, Agent, or Firm—McWilliams, Mann, Zummer & Sweeney

[57] ABSTRACT

This invention relates to a quick connect type of tube connector which engages the outside diameter of the tube with a self-locking capability and which increases its gripping action on the tube by fluid pressure developed behind a piston in a chamber housing the piston and having seals between the piston and chamber and between the tube and an axially slidable member applying initial gripping action on the tube.

8 Claims, 5 Drawing Figures

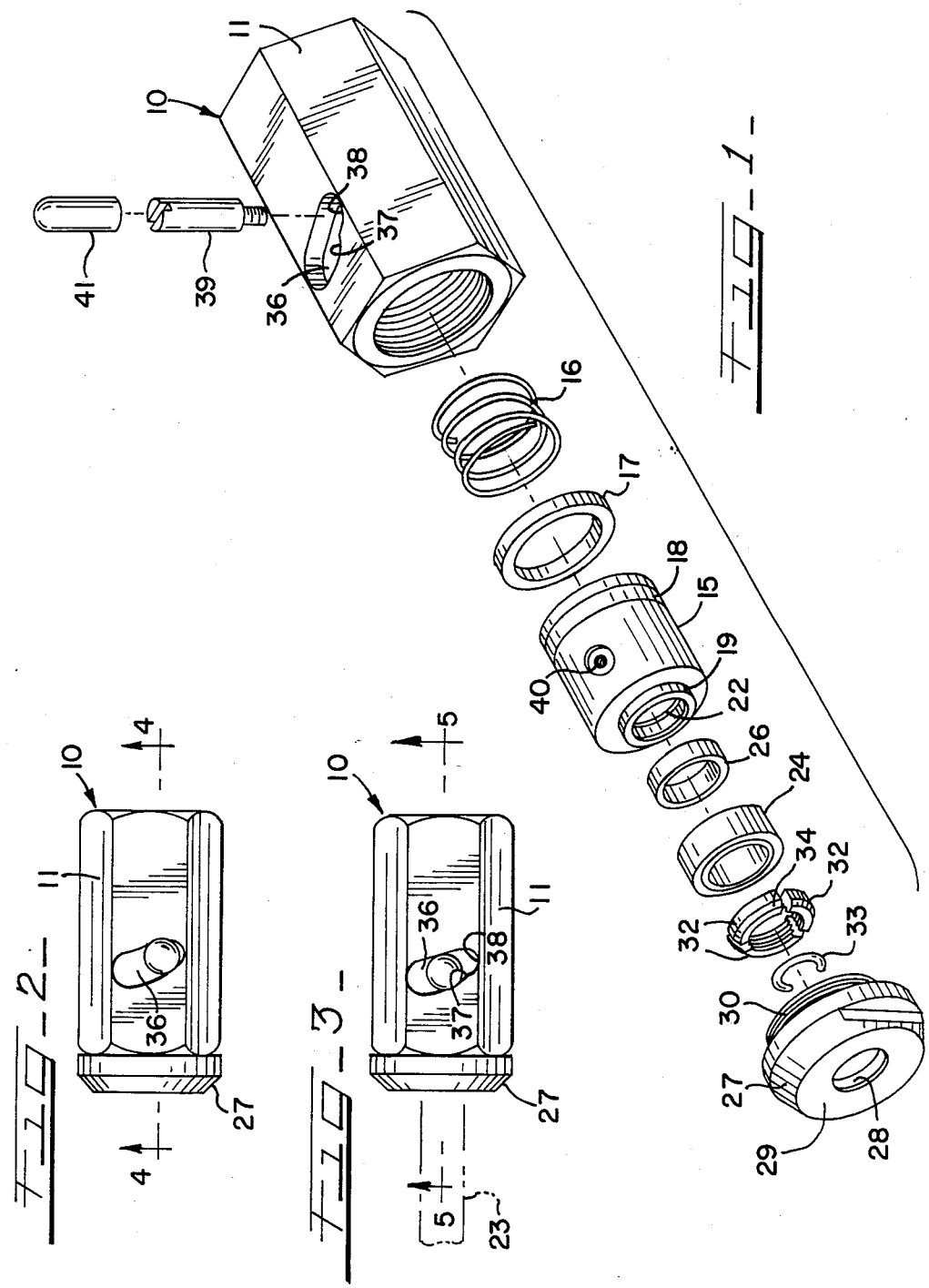

TUBE CONNECTOR

BACKGROUND OF THE INVENTION

1. Field of the Invention:

The invention relates to the field of tube connectors for connecting a pressure source with a unit requiring a pressure test such as a refrigeration unit or other device.

2. Description of Prior Art:

The prior art includes inclined ramp arrangements where balls are utilized to exert pressure on a tube by movement down the ramp, gland arrangements to obtain a gripping action, self-locking arrangements and various other sealing connections which have been disclosed in the following patents.

Fischer U.S. Pat. No. 1,031,637 covers a Gripping Device for Rods, Tubes and the Like and involves balls, or rollers, in association with ramp surfaces and is concerned primarily with interlocking two parts at a particular point of adjustment.

U.S. Pat. No. 1,973,809 to Heggem relates to a Tubing Top and is concerned especially with sealing the tubing and tubing top and utilizing tapered slips cooperating with coned surfaces to apply pressure on the tubing.

Maisch U.S. Pat. No. 2,819,733 covers a Tube Sealer and Connector in the form of a quick connect which utilizes a lever as a locking device and applies endwise pressure to obtain a seal between the tube end and a sealing pad.

Racine U.S. Pat. No. 3,738,688 covers a Quick Mount Fitting utilizing a cam lever to actuate a plunger axially to engage a split collet and increase sealing pressure on an elastomeric seal around a tube.

Racine U.S. Pat. No. 3,779,587 for Tube End Fitting also uses a cam lever for applying axial pressure on a tubular plug which seals against the end of a tube and simultaneously clamps a split metal collet around the tube.

Racine U.S. Pat. No. 3,868,132 again makes use of a cam lever to exert axial pressure on a cam and is a continuation-in-part of U.S. Pat. No. 3,738,688.

U.S. Pat. No. 4,059,295 to Helm is for a Tube Coupling and uses a combination of a sleeve surrounding a tube which is clamped around the tube by a U-shaped clip with cams and ramps on the sleeve to exert a clamping action when the tube is moved outwardly of the fitting.

Earlier patents which issued to Tuthill Pump Company, assignee of the present application, include U.S. Pat. Nos. 3,422,980, 3,542,076, 3,727,952, 3,799,207, 3,825,223, and 3,857,414. These patents show different types of tube connectors, some of which seal internally to a tube, some of which seal an open aperture in a container, and others of which seal against the end of a tube as opposed to the present arrangement which seals on the outer periphery of the tube.

None of the foregoing prior patents discloses anything like the action of this invention wherein a piston is biased to cause an initial gripping force on a tube and an initial force on a seal member and then, when the chamber containing the piston is pressurized, the fluid pressure causes a supplemental force against the piston thereby simultaneously increasing the gripping force and the sealing force.

SUMMARY OF THE INVENTION

The present invention provides a tube connector which incorporates a collet-type gripping mechanism at one end and a connection to a pressure source at the other end. The pressure source may be adapted to provide either positive or negative pressure depending upon the pressure conditions under which the device to be tested operates. Devices which operate under vacuum conditions are tested under negative conditions, and devices which contain a positive pressure are tested under like conditions. The tube connector is initially self-locking and self-sealing. Upon pressurization of the connector, a supplemental gripping and sealing force is applied which increases the gripping pressure exerted by the collet-gripping mechanism on the tube and simultaneously increases the pressure exerted against a seal member which increases the sealing effectiveness of the seal member against the outer periphery of the tube.

The improved effectiveness of the present arrangement is accomplished by a sliding piston disposed in a hollow chamber of a body member, the piston having a central passage therethrough so as to allow fluid pressure to flow from the pressure source to the device being tested. The tube connector is arranged such that a slot is provided through the wall of the body member which coacts with a piston actuator connected to the piston and extending through the slot. The slot includes a load position at one end and a test position at the other end. When the piston actuator is placed in the load position, the piston is secured out of engagement with the gripping mechanism and the tube seal. When the piston actuator is moved from the load position into the test position, the piston moves longitudinally within the chamber actuating the collet-type gripping mechanism into gripping engagement with the outer periphery of the tube. The piston simultaneously actuates the tube seal forcing its inner periphery into sealing engagement with the outer periphery of the tube. Upon pressurization of the chamber by the source of fluid pressure, the pressure acting against the rear wall of the piston exerts a second and supplemental force against the piston causing an increase in the gripping force exerted by the gripping mechanism and simultaneously causing an increase in the force applied by the piston on the tube seal thereby increasing the effectiveness of the tube seal against the outer periphery of the tube. The actuator and slot also function to prevent any significant rearward movement of the piston when a negative pressure is used.

DESCRIPTION OF THE DRAWINGS

FIG. 1 is an exploded perspective of the tube connector of this invention showing the several parts of the connector in complete detail;

FIG. 2 is a top plan view of the assembled connector showing the piston actuator in the load position;

FIG. 3 is a top plan view of the connector showing the piston actuator in the test position;

DESCRIPTION OF PREFERRED EMBODIMENT

This invention relates to a tube connector which is self-sealing and self-locking that is adapted to tightly grip the outer surface of a tube inserted into an open end thereof and seal the outer diameter of the tube whereby a pressure test of the unit to which the tube is connected can be quickly made. Such test can be made on a device such as a refrigeration unit, or other device requiring a pressure test to determine its ability to function under either positive or negative pressure.

Figure 4:
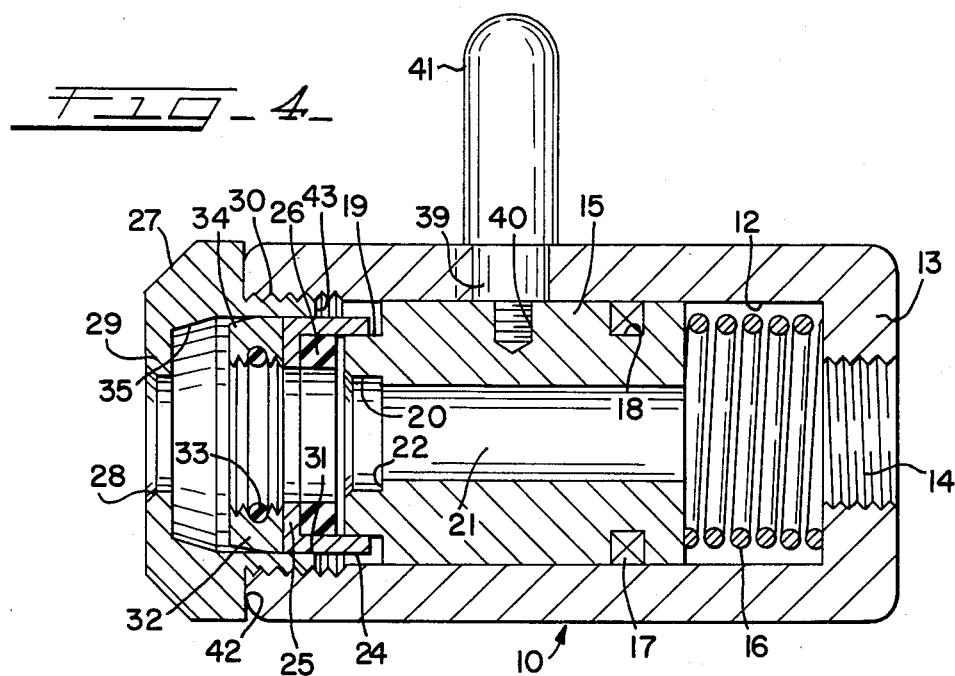
FIG. 4 is a central longitudinal sectional view through the connector taken along the lines 4—4 of FIG. 2 showing a tube inserted into the collet end of the connector.

In the drawings, the reference 10 indicates a hollow body member illustrated as having a hexagonal form 11 on its outer surface and having a cylindrical interior, forming a chamber 12. The rear end wall 13 of the body member, shown in FIG. 4, is provided with a threaded opening 14 for connection to a source of fluid pressure, to enable a refrigeration unit to be tested. The hexagonal form of the body member enables a wrench to be applied thereto for tightening the body onto the source of fluid pressure.

A piston 15 is disposed in the chamber 12 and is rotatable and movable longitudinally therein and is biased by a spring 16 to move toward the open end of the body member 10. A first seal 17 surrounds the piston within a groove 18 and acts as a seal between the piston and the internal wall of the chamber 12 so that fluid pressure built up behind the piston entering through the opening 14 does not escape around the piston.

Figure 5:
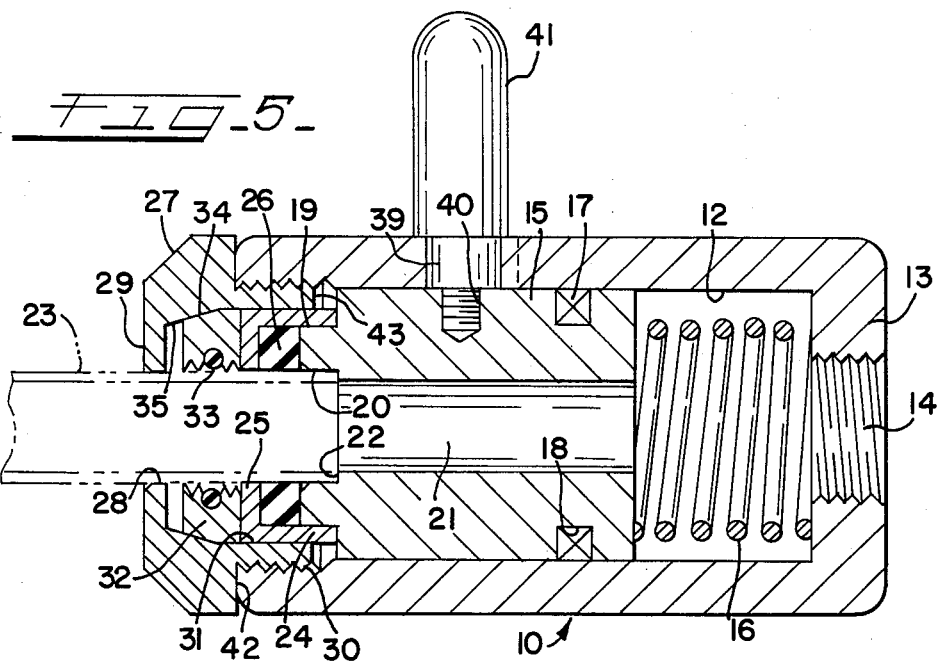
FIG. 5 is a central longitudinal sectional view through the connector taken along the lines 5—5 in FIG. 3 showing the parts in position in the test mode.

At its front end, the piston 15 is provided with a projecting collar 19 of reduced diameter having an internal bore 20 of somewhat greater diameter than the continuous bore 21 extending entirely through the piston with an annular shoulder 22 formed at the juncture of the two bores. A tube 23 is adapted to be inserted through the open end of the body member 10 and enters the bore 20 with its inner end abutting the shoulder 22 as indicated in FIG. 5.

The collar 19 projects from the front end of the piston into a seal retainer 24 having a front wall 25 with a second seal 26 in the retainer disposed between the front surface of the collar 19 and the front wall 25 of the retainer so that, in effect, the seal is confined on three sides and the fourth side, or inner periphery, encircles the tube 23.

A cylinder head 27 having an opening 28 through its front wall 29 for passage of the tube 23 is screwed into the open front end of the body member 10 as by the threaded connection 30. The head 27 has a cylindrical bore 31 into which the seal retainer 24 is slidingly disposed for some longitudinal movement under the impetus of the piston 15. A collet-type, tube-gripping mechanism includes a three-part collet 32 disposed in the head 27 in front of the retainer 24 to surround the tube 23 with the front wall 25 of the retainer bearing against the collet structure which is held in its open or expanded position against the inner bore 31 by a spring 33.

The collet 32 and the seal retainer 24 with the seal 26 are assembled into the head 27 before the head is screwed into the open end of the body member and the spring 33 holds the collet parts expanded while this assembly is made.

The collet 32 has a tapering outer surface 34 and the inner periphery of the head 27 is similarly tapered as at 35 so that when the collet parts are forced into the head by the piston 15, the collet is caused to compress, thus gripping the tube 23 to hold the tube within the opening 28 and engaged in abutting relation to the shoulder 22. The further the collet is urged to the left, as shown in FIG. 5, the greater is the gripping force exerted on the tube.

Means are provided for actuating the piston 15 manually between a load position and a test position. A slot 36 extends through the wall of the body member 10 (best revealed in FIGS. 2 and 3) and this slot is disposed at an angle to the central axis of the body member. A load position 37 is defined at one end and a test position or range of positions 38 is shown adjacent thereto.

An actuator pin 39 is threaded into an opening 40 in the piston and extends through the slot 36 where it can be grasped by an operator. The load position of the slot defines a slot width slightly in excess of the diameter of pin 39 which may be approximately ¼ inch in diameter. The test position portion of the slot is of greater width as, for example, 5/16 inch, and allows greater lateral movement of the piston within limits. The pin 39 is covered by a cap 41 for aesthetic purposes. When this pin is disposed in the load position shown in FIG. 2, the piston 15 and the collet and seal retainer are disposed as shown in FIG. 4 so that the tube 23 can be inserted into the open end and engaged against the shoulder 22. This is the load position. The projecting front collar 19 is entered into the seal retainer 24 but out of contact with the seal 26 with the collet parts biased to open position by the spring 33.

After insertion of the tube 23 into the body member 10, the actuator 39 is moved along the slot 36 to the test position 37 which rotates the piston 15 and, at the same time, moves the piston 15 toward the open end of the body and brings the collar 19 into engagement with the seal 26 and the seal retainer 24 as shown in FIG. 5. This action moves the collet 32 into the tapered area 35 of the head 27 to compress the collet around the tube with a secure locking force. The seal 26 is compressed on the tube to form the initial seal, whereupon the tube connector is ready for pressure testing. This is the test position as shown in FIGS. 3 and 5.

Next, pressure from the pressure source is applied to the connector and enters the chamber 12 through opening 14. Assuming that a positive pressure is applied, this pressure acts against the rear face of the piston 15 creating a force supplemental to the force of the spring 16 causing the piston 15 to move further to the left. The collar 19 engages the seal 26 to further compress it and cause it to expand radially, thereby forcing the inner periphery thereof into tighter sealing relationship with the outer surface of the tube 23. Simultaneously, the retainer front wall 25 engages the collet 32 forcing it further into the head 27 causing the collet parts to more tightly contract causing an increase in the gripping force exerted by the collet on the tube. The greater the pressure in chamber 12, the greater is the supplemental gripping force and the supplemental sealing force.

If a negative pressure is applied to the chamber to vacuum test the device, there is no supplemental force acting against the rear of the piston. Rather a supplemental force acts against the piston urging it to act against the force of the spring 16. Depending upon the spring force and the negative pressure applied, there might exist a supplemental force sufficient in magnitude to overcome the spring force and move the piston to the right, thereby decreasing the gripping and sealing forces. It has been found that the diagonal arrangement of the slot 36 prevents this from happening since the pin would engage the rear of the slot preventing any further rearward movement of the piston.

After the test has been completed, the test pressure is released. The connector is pushed against the tube 23 to depress the spring 16 which will permit the actuator 39 to be moved to the load position 38. When the piston is moved to this position, the collet 32 is caused to open by the spring 33 and the tube is free to be removed.

Various features of the invention have been particularly shown and described in connection with the illustrated embodiments of the invention. However, it must be understood that these particular arrangements merely illustrate and that the invention is to be given its fullest interpretation within the terms of the appended claims.

What is claimed is:

1. A tube connector for connecting a tube to a source of fluid pressure, said connector including a hollow body member defining an opening at one end to allow for insertion of a tube and defining an opening at the other end adapted to be connected to said fluid pressure source; a chamber defined internal to said body member; a piston disposed within said chamber adapted to move longitudinally within the chamber, said piston having opposite end faces and a fluid passage therethrough; extending between said opposite end faces thereof a first seal disposed between said piston and the internal wall of said chamber; so as to seal against the passage of fluid pressure therebetween a slot defined through the wall of said body member including a load position at one end and a test position at the other end; a piston actuator connected to said piston extending through and movable within said slot such that when said actuator is placed in said load position of said slot, said piston is secured against longitudinal movement relative to said body member and, when said actuator is moved from the load position to said test position, said piston is caused to move longitudinally relative to said body member toward said opening at said one end of said body member; tube gripping means disposed toward said opening at said one end of said body member a second seal disposed between said gripping means and said piston, said gripping means and second seal positioned so as to encircle the outer periphery of said tube when said tube is inserted into said connector; and resilient biasing means associated with said piston to urge said piston toward said gripping means and said second seal whereby when said piston actuator is placed in the load position, the piston is secured out of engagement with said gripping means and said second seal, when said piston actuator is placed in the test position, said biasing means exerts a first force against said piston causing it to actuate said gripping means into gripping engagement with the outer periphery of said tube with a first force and simultaneously causing said piston to engage said second seal forcing its inner periphery into sealing engagement with the outer periphery of said tube and, whereby upon positive pressurization of said chamber by said source of fluid pressure, the pressure acting against the piston exerts a second and supplemental force against said piston causing an increase in the gripping force exerted by said gripping means on said tube and simultaneously causing an increase in the force applied by said piston on said second seal thereby increasing the effectiveness of said second seal against the outer periphery of said tube.

2. A tube connector as set forth in claim 1 wherein said slot is disposed at an acute angle to the central axis of said body member whereby when said piston actuator is moved from said load position to said test position, said piston is simultaneously rotated and caused to move longitudinally toward said open end of said body member.

3. A tube connector as set forth in claim 2 wherein said slot coacts with said piston actuator to limit rearward movement of said piston when said chamber is exposed to negative pressure from said pressure source.

4. A tube connector as set forth in claim 1 wherein said tube-gripping means includes a multi-part collet, tapering surfaces adjacent the open end of said body member, and tapering faces on said collet parts engaging said tapering surfaces when actuated by the piston to cause the collet parts to contract around said tube and increase the gripping force on the tube.

5. A tube connector as set forth in claim 4 wherein said piston simultaneously engages to said second the seal and actuates the tube-gripping means to cause said second seal to engage the periphery of said tube as the collet parts grip the tube.

6. A tube connector as set forth in claim 4 wherein said hollow body member has a separate head member having said tapering surfaces, and said second seal and collet parts are contained in said head member.

7. A tube connector as set forth in claim 3 wherein said gripping means includes a circular spring disposed inwardly of said collet parts adapted to expand said parts outwardly against the confinement of said head member.

8. A tube connector as set forth in claim 1 wherein said piston has a projecting annular collar at its front end to engage said second seal at the same time as the piston actuates said gripping means.

* * * * *